(12) United States Patent
Breeden, III et al.

(10) Patent No.: US 9,517,714 B2
(45) Date of Patent: Dec. 13, 2016

(54) CONNECTOR ANCHOR HAVING MULTIPLE DIRECTION CONNECTIVITY

(71) Applicant: WINSTON PRODUCTS LLC, Cleveland, OH (US)

(72) Inventors: Winston Breeden, III, Chagrin Falls, OH (US); Ryan William Chepla, Shaker Heights, OH (US); Aaron Misener, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 0 days.

(21) Appl. No.: 15/158,907

(22) Filed: May 19, 2016

(65) Prior Publication Data

US 2016/0264037 A1 Sep. 15, 2016

Related U.S. Application Data

(62) Division of application No. 14/690,850, filed on Apr. 20, 2015.

(60) Provisional application No. 62/011,138, filed on Jun. 12, 2014.

(51) Int. Cl.
*B60P 7/08* (2006.01)

(52) U.S. Cl.
CPC ............ *B60P 7/0815* (2013.01); *B60P 7/0807* (2013.01)

(58) Field of Classification Search
CPC .............................. B60P 7/0815; B60P 7/0807
USPC ............. 410/8, 102, 104–106, 108–110, 112–116,410/144, 145, 149, 150; 24/265 CD; 211/192; 248/499
See application file for complete search history.

(56) References Cited

U.S. PATENT DOCUMENTS

| | | | |
|---|---|---|---|
| 2,856,866 A | 10/1958 | Hall | |
| 5,941,667 A | 8/1999 | Hardison | |
| 6,626,623 B2 * | 9/2003 | DeLay | B60P 7/0815 410/115 |
| 6,742,974 B2 * | 6/2004 | Haire | B60P 7/0815 410/115 |
| 2015/0067994 A1 | 3/2015 | Chepla | |

* cited by examiner

*Primary Examiner* — Stephen Gordon
(74) *Attorney, Agent, or Firm* — Cooper Legal Group LLC

(57) ABSTRACT

A connector anchor has a longitudinal axis and an aperture for receiving the buckle clip. The aperture has a first extent portion extending in a direction along the longitudinal axis of the connector anchor for receiving a buckle clip in a first orientation. The aperture has a second extent portion crossing the first extend portion and extending in a direction transverse to the longitudinal axis of the connector anchor for receiving the buckle clip in a second, different orientation. The aperture has a third extent portion crossing the first and second extend portions and extending in a direction at an acute angle relative to the longitudinal axis of the connector anchor for receiving the buckle clip in a third, different orientation.

7 Claims, 5 Drawing Sheets

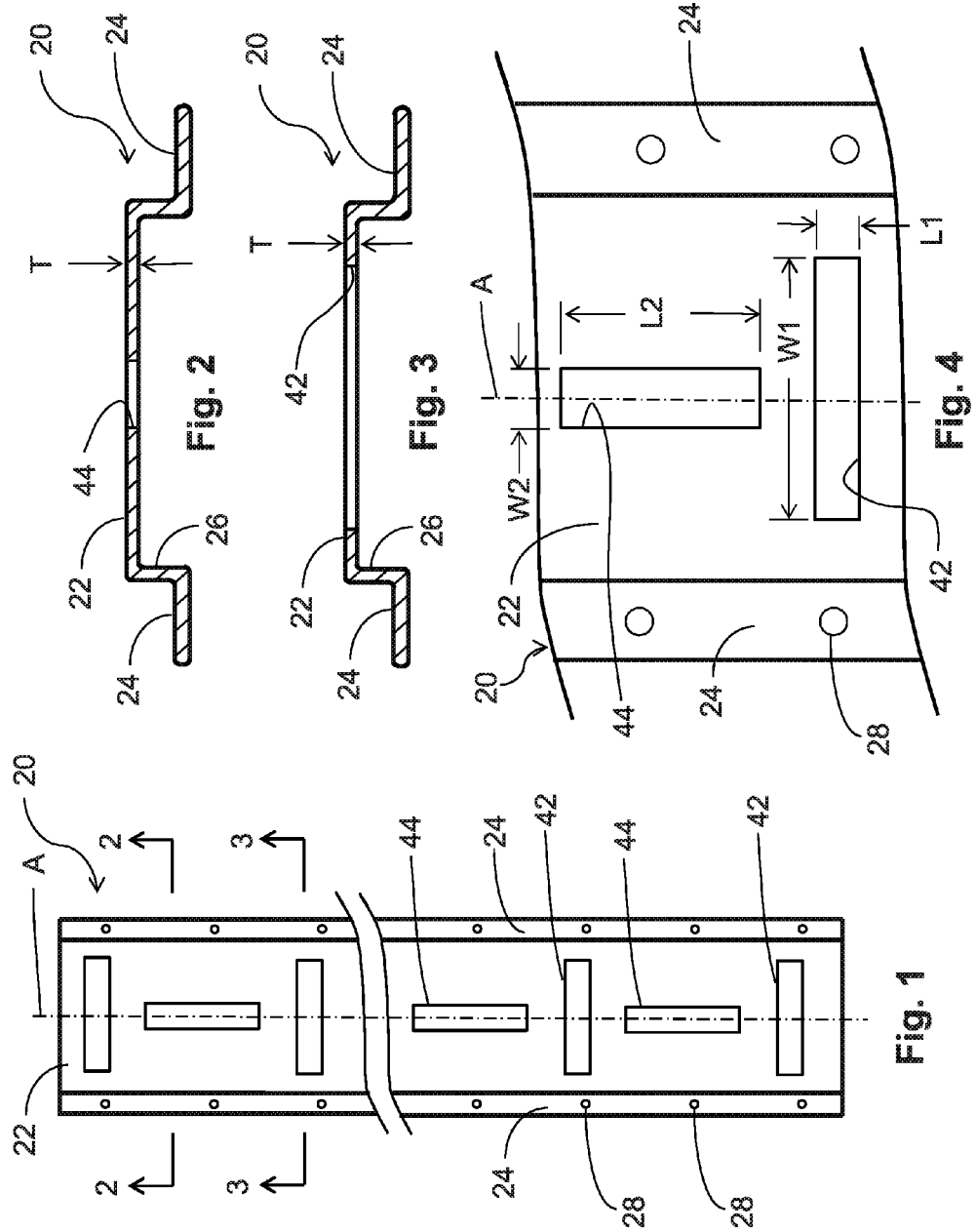

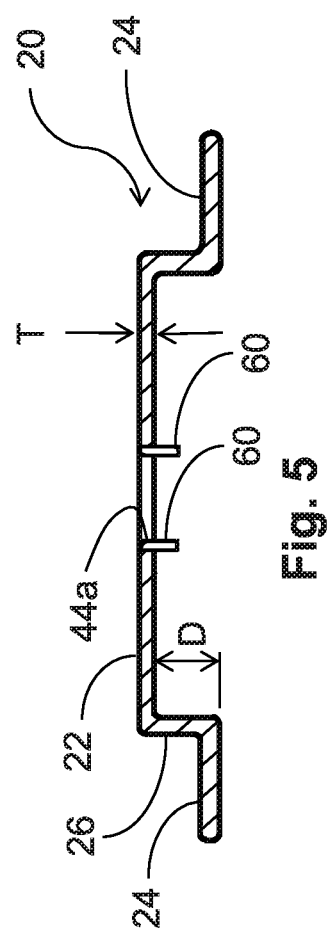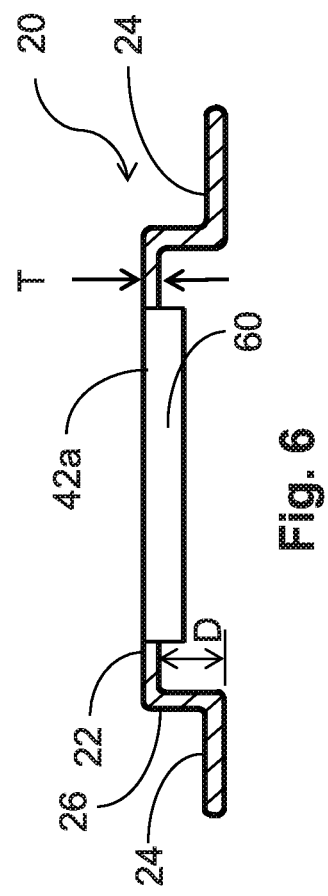

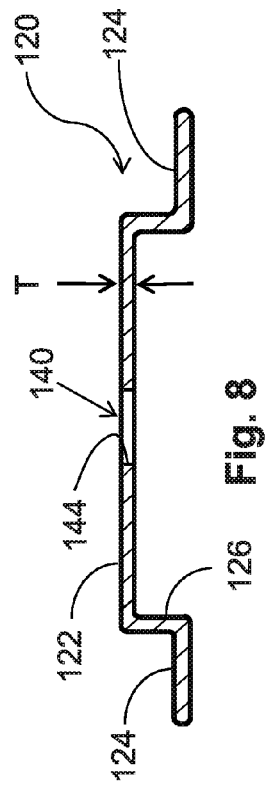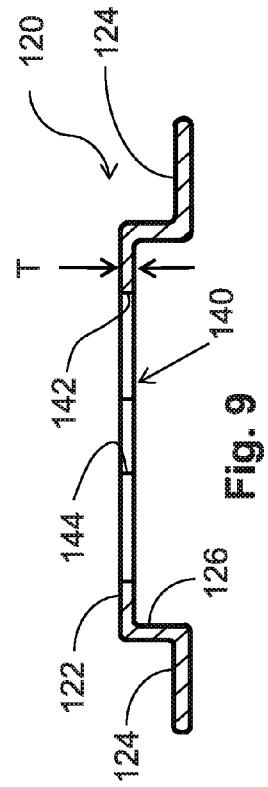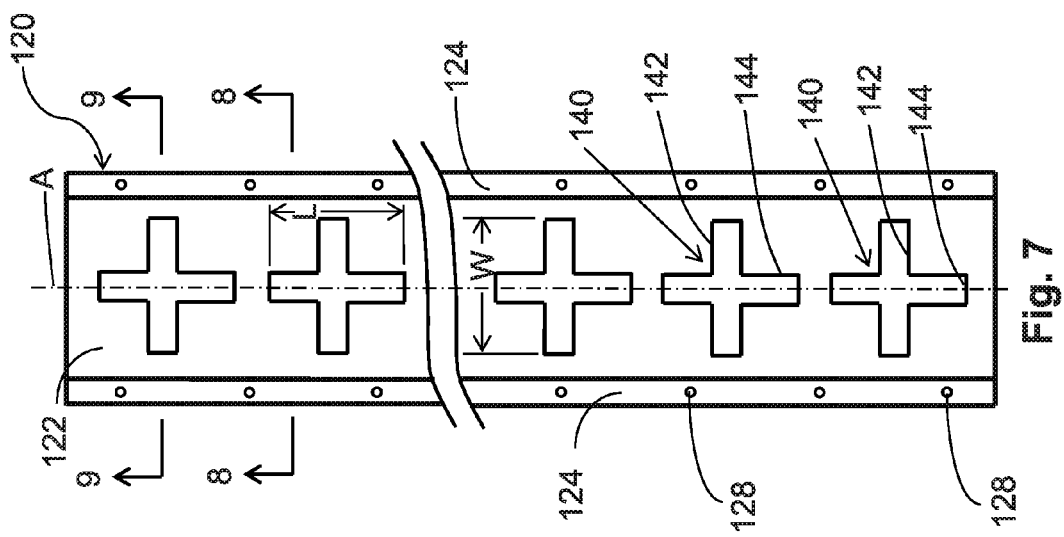

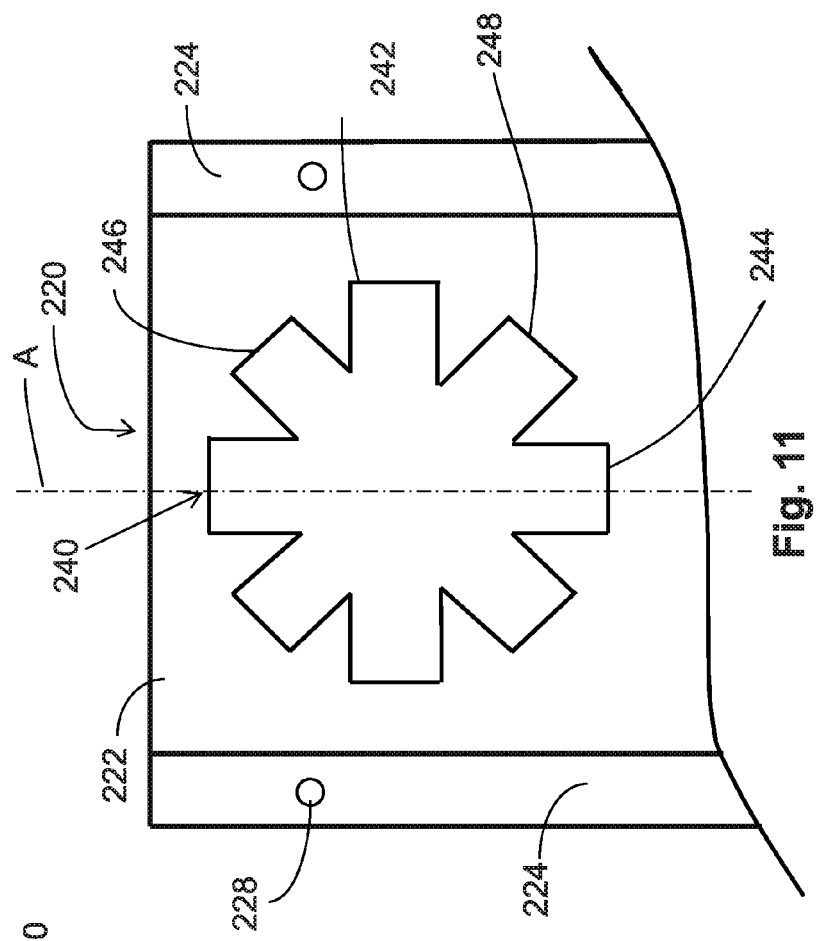
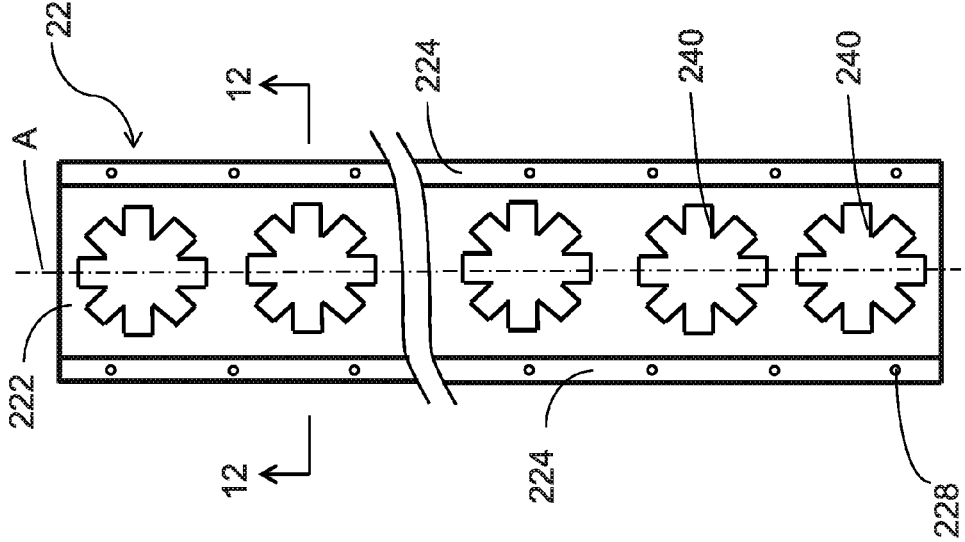

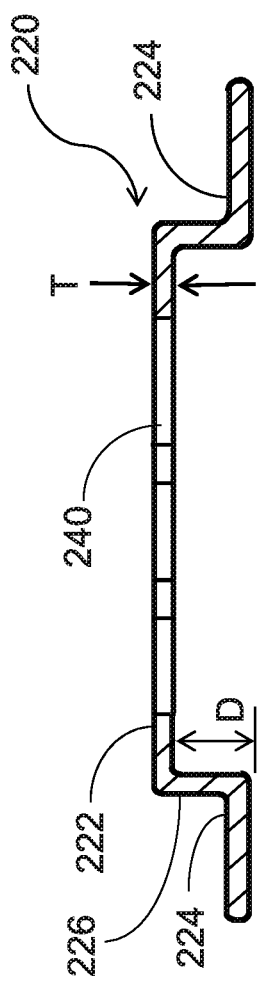
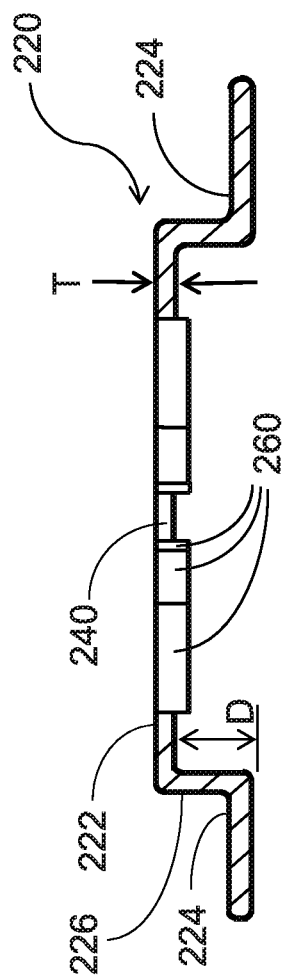

CONNECTOR ANCHOR HAVING MULTIPLE DIRECTION CONNECTIVITY

CROSS REFERENCE TO PRIOR CO-PENDING APPLICATIONS

This application claims the benefit of U.S. patent application Ser. No. 14/690,850 filed Apr. 20, 2015, entitled CONNECTOR ANCHOR HAVING MULTIPLE DIRECTION CONNECTIVITY, and U.S. Provisional Application No. 62/011,138 filed Jun. 12, 2014, entitled CONNECTOR ANCHOR HAVING MULTIPLE DIRECTION CONNECTIVITY, the entire disclosures of which are hereby incorporated herein by reference.

TECHNICAL FIELD

This relates generally to connector anchors for securing objects, such as cargo, with flexible strapping to a vehicle and particularly relates to a connector anchor type referred to as an "E-Track".

BACKGROUND

Connector anchors, commonly referred to as "E-Tracks" are used in various applications, such as in the cargo transportation industry. The connector anchors secure cargo to a transporting vehicle surface (e.g., a side, floor or roof of a container, truck hold, load bed, dolly, or other cargo areas) by flexible strapping (e.g., webs, belts or the like) attached to industry standard buckle clips. In one specific application, the strapping or straps are used for holding one or more cargo objects so they will not shift or move during transportation and cause damage or loss by either striking sides of the transporting vehicle, container or other objects. Such connector anchors are typically mounted to the transporting vehicle, such as trucks, railroad cars, airplanes and shipping containers.

In a typical application, multiple connector anchors are mounted to the transporting vehicle. Each of the connector anchors includes a series of apertures.

Each aperture may receive the complementary industry standard buckle clip. The buckle clip is attached to the strapping, webbing, rope or chain or is attached to a tie down anchor point for connection with securement hardware attached to strapping, rope or chain. The strapping is routed to secure the cargo in a desired or needed manner. The buckle clip is secured to an aperture of a connector anchor. The strapping can then be tightened (e.g., via ratchet, winch, turn buckle, etc.) to secure the cargo.

Connector anchors have apertures that are generally rectangular and have a major opening dimension and a relatively smaller minor opening dimension. The buckle clip has complementary dimensions so that the buckle clip interfaces with the respective aperture in a specific orientation. Within a connector anchor having multiple apertures, all of the apertures are oriented in the same direction. Thus, for a connector anchor with multiple apertures, the apertures are all orientated in the same direction. For example, the rectangular apertures are all aligned in a spaced parallel orientation pattern. Accordingly, the buckle clip that mates with an aperture of the connector anchor must be oriented to conform to the direction or orientation of the aperture in the particular connector anchor. This mismatch of orientation between the buckle clip and aperture can lead to excessive twist and stress in the strapping, webbing, rope, chain or securement hardware.

For some applications, multiple connector anchors are used that have different aperture orientation. This adds material and labor cost to install additional connector anchors. Thus, it is desired to provide an improved connector anchor that does not suffer from these and other disadvantages.

BRIEF SUMMARY

The following presents a simplified summary in order to provide a basic understanding of some example aspects. This summary is not an extensive overview. Moreover, this summary is not intended to identify critical elements nor delineate the scope or any aspect. The sole purpose of the summary is to present some concepts and aspects in simplified form.

In accordance with one aspect, a connector anchor is provided for receiving and retaining a buckle clip relative to a mounting structure of a cargo environment. The connector anchor includes a main mounting portion extending in a plane. The connector anchor includes at least one flange configured for engagement with the mounting structure and configured for being secured to the mounting structure. The at least one flange is offset a distance from the main mounting portion and extending substantially parallel to the main mounting portion. The connector anchor includes at least one connecting portion extending between and interconnecting the main mounting portion to the at least one flange. The at least one flange extends transverse to the main mounting portion and the at least one flange. The main mounting portion, the at least one flange and the at least one connecting portion are configured to offset the main mounting portion from the mounting structure and to provide a buckle clip receiving space. The main mounting portion has a longitudinal axis and an aperture for receiving the buckle clip. The aperture has a first extent portion extending in a direction along the longitudinal axis of the connector anchor for receiving the buckle clip in a first orientation. The aperture has a second extent portion crossing the first extend portion and extending in a direction transverse to the longitudinal axis of the connector anchor for receiving the buckle clip in a second, different orientation. The aperture has a third extent portion crossing the first and second extend portions and extending in a direction at an acute angle relative to the longitudinal axis of the connector anchor for receiving the buckle clip in a third, different orientation.

Other aspects are provided by the details presented herein. It is to be understood that both the foregoing general description and the following description present example and explanatory embodiments or aspects, and are intended to provide an overview or framework for understanding the nature and character of what is claimed. The accompanying drawings are included to provide a further understanding and are incorporated into and constitute a part of this specification. The drawings illustrate various example embodiments or aspects, and together with the description, serve to explain the principles and operation.

BRIEF DESCRIPTION OF THE DRAWINGS

The foregoing and other embodiments and aspects will become apparent to those skilled in the art upon reading the following description with reference to the accompanying drawings, in which:

FIG. 1 is a plan view of a connector anchor according to an exemplary aspect;

FIG. 2 is a cross-sectional view of the connector anchor of FIG. 1, taken approximately along line 2-2 in FIG. 1;

FIG. 3 is a cross-sectional view of the connector anchor of FIG. 1, taken approximately along line 3-3 in FIG. 1;

FIG. 4 is an enlarged view of a portion of the connector anchor of FIG. 1 illustrating the orientations and dimensions of apertures in the connector anchor;

FIG. 5 is a cross-sectional view of the connector anchor of FIG. 1 similar to FIG. 2 and illustrating an alternate aspect;

FIG. 6 is a cross-sectional view of the connector anchor of FIG. 1 similar to FIG. 3 and illustrating the alternate aspect;

FIG. 7 is a plan view of a connector anchor according to another exemplary aspect;

FIG. 8 is a cross-sectional view of the connector anchor of FIG. 7, taken approximately along line 8-8 in FIG. 7;

FIG. 9 is a cross-sectional view of the connector anchor of FIG. 7, taken approximately along line 9-9 in FIG. 7;

FIG. 10 is a plan view of a connector anchor according to yet another exemplary aspect;

FIG. 11 is an enlarged view of a portion of the connector anchor of FIG. 10 illustrating the orientations and dimensions of aperture extents in the connector anchor;

FIG. 12 is a cross-sectional view of the connector anchor of FIG. 10, taken approximately along line 12-12 in FIG. 10; and FIG. 13 is a cross-sectional view similar to FIG. 12 and illustrating an alternate aspect.

DESCRIPTION OF EXAMPLE EMBODIMENTS

An exemplary embodiment that incorporates one or more aspects is described below and illustrated in the drawings. The illustrated example is not intended to be a limitation. One or more aspects can be utilized in other embodiments or aspects and even other types of devices. Certain terminology is used for convenience only and is not to be taken as a limitation. Still further, in the drawings, the same reference numerals are employed for designating the same elements.

An example connector anchor 20 according to one aspect is illustrated in FIGS. 1-4. The connector anchor 20 is intended to receive and use known E-track style buckle clips (not shown) to retain cargo. The connector anchor 20 is elongate and has a longitudinally extending axis A. Common lengths of the connector anchor 20 may be 5', 4', 3' and 2'. The connector anchor 20 is made from any suitable material having sufficient strength for the intended purpose, such as a metal like steel or aluminum. The connector anchor 20 is typically formed by any suitable method, such as by rolling, extruding and/or stamping. The connector anchor 20 has an overall average thickness T (FIGS. 2-3).

The connector anchor 20 includes a main mounting portion 22. The connector anchor 20 also a pair of flanges 24 extending from opposite lateral sides of the main mounting portion 22. Each of the flanges 24 extends substantially parallel to and is offset from the plane containing the main mounting portion 22. Each of the flanges 24 is connected to the main mounting portion 22 by a respective integrally formed connecting portion 26.

The connector anchor 20 is secured by suitable fasteners (not shown), such as screws, nails or the like, to a mounting surface of the transporting vehicle, such as a floor, ceiling or wall, by the use of holes 28 formed in the flanges 24. Each of the flanges 24 has multiple holes 28 spaced along the longitudinal extent of the connector anchor 20. The connector anchor 20 is secured to the mounting surface of the transporting vehicle with the fasteners extending though the holes 28.

The connector anchor 20 includes at least a pair of apertures 42, 44 for receiving a buckle clip. In the illustrated example, multiple apertures 42, 44 are formed in the connector anchor 20. The specific number of apertures 42, 44 typically depends on the length of the connector anchor 20. The apertures 42, 44 are of similar rectangular size. Each of the apertures 42, 44 is configured as a rectangular shape to receive a portion of the known buckle clip. It will be apparent that any number and sizes of apertures 42, 44 could be provided that is appropriate for the length of the connector anchor 20 and the intended application.

The apertures 42, 44 are arranged in an alternating orientation pattern such that the buckle clip received within the aperture can be selected from two different orientations as may be required or convenient by the orientation of the buckle clip and cargo security strapping. The apertures 42, 44 are arranged so that adjacent apertures extend substantially orthogonally, and preferably perpendicularly, relative to one another. Orientation of the buckle clip may be more important than the length of the strapping to which the buckle clip is attached. The needed orientation of the buckle clip and length of strapping, of course, depends on the requirements of the cargo being transported.

Each of the apertures 42 has a major dimension or width W1 (FIG. 4) and a minor dimension or length L1. The width W1 is greater than the length L1. The orientation of each of the apertures 42 is such that the width W1 extends transversely, orthogonally or preferably perpendicularly relative to axis A of the connector anchor 20. Thus, the smaller dimensional length L1 extends in a direction substantially along the axis A of the connector anchor 20. While the length L1 is illustrated as extending parallel to the axis A and the width W1 extending perpendicular to the axis A, it will be apparent that the orientation of aperture 42 will can be oriented at an angle relative to the axis A of the connector anchor 20.

Each of the apertures 44 has a minor dimension or width W2 and a major dimension or length L2. The width W2 is less than the length L2. The orientation of each of the apertures 44 is such that the width W2 extends transversely, orthogonally or preferably perpendicularly relative to axis A of the connector anchor 20. Thus, the larger dimensional length L2 extends in a direction substantially along the axis A of the connector anchor 20. While the length L2 is illustrated as extending parallel to the axis A and the width W2 extending perpendicular to the axis A, it will be apparent that the orientation of aperture will 42 can be oriented at an angle relative to the axis A.

The orientation of the length L1 of the aperture 42 relative to the length L2 of the aperture 44 is substantially orthogonal. In the illustrated example, the relative orientations are such that the apertures 42, 44 extend substantially perpendicular (e.g., at or near 90°) relative to each other. It is contemplated that different relative orientations (e.g., different that 90°) are possible.

The alternating relative orientation of the apertures 42, 44 are such that the buckle clip that is to be received within an aperture can engage the connector anchor 20 in two different orientations as may be required by the orientation of the buckle clip and strapping. Orientation of the buckle clip attachment to the connector anchor 20 may be more important than the length of the strapping to which the buckle clip is attached. The length of strapping is typically adjustable whereas a desired or convenient orientation of the buckle clip engagement with previously known connector anchors is not. This of course depends on the requirements of the cargo being transported.

As is known, the buckle clip has a spring loaded safety clip that when manually retracted temporarily decreases the extent of the buckle clip. Once the buckle clip is in position within the aperture 42 or 44, the spring safety clip is released and entrapment of the buckle clip in the aperture occurs. The strapping (e.g., the webbing) typically has a certain orientation as it extends from the cargo to the connector anchor 20. Thus, the strapping extends in a direction so one of the apertures 42, 44 can be conveniently selected to provide relatively low twist and stress of the strapping.

Another feature of the connector anchor 20 is that the surfaces that define the apertures 42, 44 have no portion that is displaced outside of the thickness T of the material forming the connector anchor, as illustrated in FIGS. 2-3. That is, all of the surfaces defining the apertures 42, 44 are contained within the dimensional thickness T of the mounting portion 22 of the connector anchor 20 that results from the manufacturing process of the connector anchor. This feature enables the buckle clip to be inserted into and engage an aperture 42 or 44 with minimal effort during attachment to the connector anchor 20 and not engage any component behind the connector anchor.

An alternate aspect of the connector anchor 20 is illustrated in FIGS. 5 and 6. The surfaces that define the apertures 42a, 44a have portions 60 that are displaced outside of the thickness T of the mounting portion 22 of the connector anchor. That is, the portions 60 defining at least some of each aperture 42a, 44a extend outside of the dimensional thickness T of the connector anchor 20. However, the displaced material from a manufacturing operation forming the portions 60 does not extend beyond the depth D of the cavity formed in the connector anchor 20. This feature of the portions 60 provides additional strength to the connector anchor 20 adjacent an aperture 42a or 44a. This may be desirable in some applications.

An example connector anchor 120 according to another aspect is illustrated in FIGS. 7-9. The connector anchor 120 is intended to receive and use known E-track style buckle clips (not shown) to retain cargo. The connector anchor 120 is elongate and has a longitudinally extending axis A. Common lengths of the connector anchor 120 may be 5', 4', 3' and 2'. The connector anchor 120 is made from any suitable material having sufficient strength for the intended purpose, such as a metal like steel or aluminum. The connector anchor 120 is typically formed by any suitable method, such as by rolling, extruding or stamping. The connector anchor 120 has an overall average thickness T (FIGS. 8-9).

The connector anchor 120 includes a main mounting portion 122. The connector anchor 120 also a pair of flanges 124 extending from opposite lateral sides of the main mounting portion 122. Each of the flanges 124 extends substantially parallel to and is offset from the plane containing the main mounting portion 122, as illustrated in FIGS. 8-9. Each of the flanges 124 is connected to the main mounting portion 122 by a respective connecting portion 126.

The connector anchor 120 is secured by suitable fasteners (not shown), such as screws, nails or the like, to a mounting surface of the transporting vehicle, for example a floor, ceiling or wall, by the use of holes 128 formed in the flanges 124. Each of the flanges 124 has multiple holes 128 spaced along the extent of each of the flanges. The connector anchor 120 is secured to the mounting surface of the transporting vehicle with the fasteners extending though the holes 128.

The connector anchor 120 includes at least one aperture 140 defined by aperture extents 142, 144 to form an "X" or cross shape. In the illustrated example, multiple apertures 140 are formed in the connector anchor 120 and spaced apart along the axis A of the connector anchor. The specific number of apertures 140 typically depends on the length of the connector anchor 120.

The aperture extents 142, 144 are of similar rectangular sizes. Each of the aperture extents 142, 144 is configured as a rectangular shape to receive a known buckle clip. It will be apparent that any number and sizes of apertures 140 could be provided that is appropriate for the length of the connector anchor 120 and the intended application.

The aperture extents 142, 144, are arranged in a relatively orthogonal orientation pattern. Thus, the buckle clip received within the aperture 140 can be selected from two different orientations as may be required or convenient by the orientation of the buckle clip and cargo securing strapping. Orientation of the buckle clip may be more important than the length of the strapping to which the buckle clip is attached. The needed orientation of the buckle clip and length of strapping, webbing, rope or chain of course, depends on the requirements of the cargo being transported.

Each of the aperture extents 142 has a width W (FIG. 7). Each of the aperture extents 144 has a length L. The width W is substantially equal to the length L. The orientation of each aperture extent 142 is such that the width W preferably extends transversely, orthogonally or preferably perpendicularly relative to axis A of the connector anchor 120. While the width W is illustrated as extending perpendicular to the axis A, it will be apparent that the orientation of aperture extent 142 can be oriented at an angle relative to the axis A of the connector anchor 120.

The length L of each of the aperture extent 144 preferably extends in a direction substantially along or parallel to the axis A of the connector anchor 120. While the length L is illustrated as extending parallel to the axis A, it will be apparent that the orientation of aperture extent 144 can be oriented at an angle relative to the axis A of the connector anchor 120. In the illustrated example, the relative orientations are such that the aperture extents 142, 144 extend substantially perpendicular (e.g., at or near 90°) relative to each other. It is contemplated that different relative orientations (e.g., different that 90°) are possible.

As is known, the buckle clip has a spring loaded safety clip that when manually retracted temporarily decreases the extent of the buckle clip. Once the buckle clip is in position within the aperture 140 the spring safety clip is released and entrapment of the buckle clip in the aperture occurs. The strapping (e.g., the webbing) typically has a certain orientation as it extends from the cargo to the connector anchor 120. Thus, the strapping extends in a direction so one of the aperture extents 142, 144 of an aperture 140 is selected to provide relatively low twist and stress of the strapping, webbing, rope or chain.

Another feature of the connector anchor 120 is that the surfaces that define the apertures 140 have no portion that is displaced outside of the thickness T of the material forming the connector anchor. That is, all of the surfaces defining the apertures 140 are contained within the dimensional thickness T of the connector anchor 120 resulting from the manufacturing process of the connector anchor. This feature enables the buckle clip to be inserted into and engage an aperture extent 142 or 144 with minimal effort during attachment to the connector anchor 120.

An example connector anchor 220 according to yet another aspect is illustrated in FIGS. 10-13 and is a hybrid combination of the multiple orientation concept of the connector anchor 120 but in a single aperture for receiving the buckle clip. The connector anchor 220 is intended to receive and use known E-track style buckle clips to retain cargo. The connector anchor 220 is elongated and has a longitudinally extending axis A. Common lengths of the connector anchor 220 may be 5', 4', 3' and 2'. The connector anchor 220 is made from any suitable material having sufficient strength for the intended purpose, such as a metal like steel or aluminum. The connector anchor 220 is typically formed by any suitable method, such as by rolling, extruding or stamping. The connector anchor 220 has an overall average thickness T (FIG. 12).

The connector anchor 220 includes a main mounting portion 222. The connector anchor 220 also a pair of flanges 224 extending from opposite lateral sides of the main mounting portion 222. Each of the flanges 224 extends substantially parallel to and is offset from the plane containing the main mounting portion 222. Each of the flanges 224 is connected to the main mounting portion 222 by a respective connecting portion 226.

The connector anchor 220 is secured by suitable fasteners (not shown), such as screws, nails or the like, to a mounting surface of the transporting vehicle, such as a floor, ceiling or wall, by the use of holes 228 formed in the flanges 224. Each of the flanges 224 has multiple holes 228 spaced along the longitudinal extent of the connector anchor 220. The connector anchor 220 is secured to the mounting surface of the transporting vehicle with the fasteners extending though the holes 228.

The connector anchor 220 includes one or a multiple apertures 240 that are spaced apart. Each aperture 240 preferably has four substantially identical extent portions 242, 244, 246, 248 (FIG. 11) for receiving a buckle clip. In the illustrated example, multiple extent portions 242, 244, 246, 248 define the apertures 240 formed in the connector anchor 220. The specific number of apertures 240 typically depends on the length of the connector anchor 220.

The extent portions 242, 244, 246, 248 of the aperture 240 are of similar discontinuous rectangular size. Each of the extent portions 242, 244, 246, 248 is configured as a discontinuous rectangular shape or a portion of a radially oriented array of rotated rectangles to receive a known buckle clip. It will be apparent that any number and sizes of apertures 240 could be provided that is appropriate for the length of the connector anchor 220 and the intended application.

The extent portions 242, 244, 246, 248 of the aperture 240 are arranged in an alternating orientation pattern such that the buckle clip received within the aperture can be selected from four different orientations as may be required or convenient by the orientation of the buckle clip. Orientation of the buckle clip may be more important than the length of the strapping to which the buckle clip is attached. The needed orientation of the buckle clip and length of strapping, of course, depends on the requirements of the cargo being transported.

Each of the extent portions 242 apertures 240 are arranged to extend transversely, orthogonally or preferably perpendicularly relative to axis A of the connector anchor 220. It will be apparent that the orientation of the extents 242 of the apertures 240 can be oriented at an angle relative to the axis A of the connector anchor 220. The remaining extent portions 244, 246, 248 of the aperture 240 will all be positioned relative to the extent portion 242 of the aperture 240.

Each of the extent portions 244 of the aperture 240 are arranged to extend transversely, orthogonally or preferably perpendicularly relative to the extent portion 242 of the aperture 240 of the connector anchor 220. Thus, the aperture portion 244 of the aperture 240 extends in a direction substantially along the axis A of the connector anchor 220. It is contemplated that slight different relative orientations (e.g., different that 90°) of the aperture portion 244 relative to the extent portion 242 of the aperture 240 are possible.

Each of the extent portions 246 of the aperture 240 are arranged to extend at an acute angle, such as 45°, relative to the extent portion 242 of the aperture 240 and the axis A of the connector anchor 220. Each of the extent portions 248 of the aperture 240 are arranged to extend at an acute angle, such as 45°, relative to the extent portion 242 of the aperture 240 and the axis A of the connector anchor 220. The angle that the extent portion 248 extends relative to the extent portion 242 of the aperture 240 and to the axis A is essentially the same as the angle that the extent portion 246 extends except in the opposite direction.

The alternating relative orientation of the extent portions 242, 244, 246 and 248 of the aperture 240 are such that the buckle clip that is to be received within an aperture can engage the connector anchor 220 in one of four different orientations as may be required by the orientation of the buckle clip. Orientation of the buckle clip attachment to the connector anchor 220 may be more important than the length of the strapping to which the buckle clip is attached. The length of strapping is typically adjustable whereas a desired or convenient orientation of the buckle clip engagement with previously known connector anchors is not. This of course depends on the requirements of the cargo being transported.

As is known, the buckle clip has a spring loaded safety clip that when manually retracted temporarily decreases the extent of the buckle clip. Once the buckle clip is in position within one of the extent portions 242, 244, 246 and 248 of the aperture 240, the spring safety clip is released and entrapment of the buckle clip in the aperture occurs. The strapping (e.g., the webbing) typically has a certain orientation as it extends from the cargo to the connector anchor 220. Thus, the strapping extends in a direction so one of the extent portions 242, 244, 246 and 248 of the aperture 240 can be selected to provide minimal twist of the strapping.

Another feature of the connector anchor 220, illustrated in FIG. 12, is that the surfaces that define the extent portions 242, 244, 246 and 248 of the aperture 240 have no portion that is displaced outside of the thickness T of the material forming the connector anchor 220. That is, all of the surfaces defining the extent portions 242, 244, 246 and 248 of the aperture 240 are contained within the dimensional thickness T of the connector anchor 220 resulting from the manufacturing process of the connector anchor. This feature enables the buckle clip to be inserted into and engage an extent portion 242, 244, 246 and 248 of the aperture 240 with minimal effort during attachment to the connector anchor 220 and minimal twisting of strapping, webbing, rope or chain attached to the buckle clip.

An alternate aspect of the connector anchor 220 is illustrated in FIG. 13. The surfaces that define the extent portions 242, 244, 246 and 248 of the aperture 240 have portion 260 that are displaced outside of the thickness T of the mounting portion 222 of the connector anchor 220. That is, portions 260 defining at least some of each of the extent portions 242, 244, 246 and 248 of the aperture 240 extend outside of the dimensional thickness T of the mounting portion 222 of the connector anchor 220. However, the displaced material from a manufacturing operation forming the portions 260 does not extend beyond the depth D of the cavity formed in the connector anchor 220. This feature of the portions 260 provides additional strength to the connector anchor 220 adjacent an extent portion 242, 244, 246, 248 of the aperture 240. This may be desirable in some applications.

Some advantages of any of the new connector anchors 20, 120, 220 are: a single connector anchor according to at least one aspect can provide multiple orientations of attachment for multiple buckle clips and strappings and possibly fewer connector anchors because of greater functionality of each connector anchor. Each connector anchor 20, 120, 220 can do the job of two or more previously known types having a single type of aperture orientation. Each connector anchor 20, 120, 220 has the ability to receive the known standard buckle clips in at least one of two different orientations or both orientations at the same time along different parts of the connector anchor. Such advantages can provide a user more options when securing cargo. The connector anchor 20, 120, 220 can be used without pre-knowledge of which mounting direction (for example, horizontal or vertical) would be best for their cargo securement needs. Also, the mounting orientation could be changed in the future, without pre-knowledge of which mounting direction (horizontal or vertical) would be best for their cargo securement needs. Such flexibility in securing cargo provides for less concern, worry, cost and effort to the user.

While at least one aspect is described, modifications and alterations will occur to others upon a reading and understanding of this specification. Such uses of embodiments incorporating one or more aspects are intended to include all such modifications and alterations insofar as they come within the scope of the appended claims.

What is claimed is:

1. A connector anchor for receiving and retaining a buckle clip relative to a mounting structure of a cargo environment, the connector anchor including:
    a main mounting portion extending in a plane;
    at least one flange configured for engagement with the mounting structure and configured for being secured to the mounting structure, the at least one flange being offset a distance from the main mounting portion and extending substantially parallel to the main mounting portion; and
    at least one connecting portion extending between and interconnecting the main mounting portion to the at least one flange; the at least one connecting portion extending transverse to the main mounting portion and the at least one flange; the main mounting portion, the at least one flange and the at least one connecting portion being configured to offset the main mounting portion from the mounting structure and to provide a buckle clip receiving space; and wherein
    the main mounting portion having a longitudinal axis and an aperture for receiving the buckle clip, the aperture having a first extent portion extending in a direction along the longitudinal axis of the connector anchor for receiving the buckle clip in a first orientation, the aperture having a second extent portion crossing the first extend portion and extending in a direction transverse to the longitudinal axis of the connector anchor for receiving the buckle clip in a second, different orientation, and the aperture having a third extent portion crossing the first and second extent portions and extending in a direction at an acute angle relative to the longitudinal axis of the connector anchor for receiving the buckle clip in a third, different orientation.

2. The connector anchor of claim 1, wherein the main mounting portion has a thickness and the aperture has surfaces defining the aperture that are contained within the thickness of the connector anchor.

3. The connector anchor of claim 1, further including a second aperture spaced from the aperture along the longitudinal axis, the second aperture having a first extent portion extending in a direction along the longitudinal axis of the connector anchor for receiving the buckle clip in a first orientation, the second aperture having a second extent portion crossing the second aperture first extent portion and extending in a direction transverse to the longitudinal axis of the connector anchor for receiving the buckle clip in a second, different orientation, and the second aperture having a third extent portion crossing the second aperture first and second extent portions and extending in a direction at an acute angle relative to the longitudinal axis of the connector anchor for receiving the buckle clip in a third, different orientation.

4. The connector anchor of claim 1, wherein the main mounting portion has a thickness and the aperture has at least one surface portion defining the aperture that extends from the mounting portion beyond the thickness of the mounting portion.

5. The connector anchor of claim 4, wherein the at least one surface portion defining the aperture extends from the mounting portion for a distance less than an offset distance to the flange.

6. The connector anchor of claim 1, further including the aperture having a fourth extent portion crossing the first, second and third extent portions and extending in a direction at an acute angle relative to the longitudinal axis of the connector anchor for receiving the buckle clip in a fourth, different orientation.

7. The connector anchor of claim 1, wherein the second extent portion has two opposed ends and a length between the two ends to receive the buckle clip between the two ends, each of the ends being offset a distance from the at least one connecting portion to permit the receipt of the buckle clip into the buckle clip receiving space.

* * * * *